US009982713B2

(12) United States Patent
Seo

(10) Patent No.: US 9,982,713 B2
(45) Date of Patent: May 29, 2018

(54) BEARING APPARATUS FOR WHEELS

(71) Applicant: JTEKT CORPORATION, Osaka-shi, Osaka (JP)

(72) Inventor: Nobuyuki Seo, Toyoake (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/392,519

(22) Filed: Dec. 28, 2016

(65) Prior Publication Data
US 2017/0198748 A1    Jul. 13, 2017

(30) Foreign Application Priority Data
Jan. 13, 2016  (JP) ................................ 2016-004251

(51) Int. Cl.
*F16C 33/76*    (2006.01)
*F16C 19/18*    (2006.01)
*F16C 33/80*    (2006.01)
*B60B 27/00*    (2006.01)

(52) U.S. Cl.
CPC ............ *F16C 19/181* (2013.01); *F16C 33/80* (2013.01); *B60B 27/0005* (2013.01); *B60B 27/0073* (2013.01); *B60B 2380/12* (2013.01); *B60B 2900/211* (2013.01); *B60B 2900/5114* (2013.01); *F16C 2326/02* (2013.01)

(58) Field of Classification Search
CPC ............ B60B 27/0005; B60B 27/0073; B60B 2380/12; B60B 2900/211; B60B 2900/5112; B60B 2900/5114; F16C 19/186; F16C 33/785; F16C 33/7866; F16C 33/7876; F16C 33/7883; F16C 33/7886; F16C 33/7889; F16C 33/80; F16C 33/805
See application file for complete search history.

(56) References Cited

U.S. PATENT DOCUMENTS

| 4,402,558 A * | 9/1983 | Olschewski ........ B60B 27/0005 384/469 |
| 9,403,405 B2 * | 8/2016 | Barberis ............... F16C 33/783 |
| 2015/0151574 A1 * | 6/2015 | Barberis ............... F16C 33/783 384/486 |

FOREIGN PATENT DOCUMENTS

| JP | 2008298106 A * | 12/2008 | ......... B60B 27/0005 |
| JP | 2012-056412 A | 3/2012 | |
| JP | 5676289 B2 * | 2/2015 | .......... F16C 33/7876 |
| WO | WO-2010013439 A1 * | 2/2010 | ......... B60B 27/0005 |
| WO | WO-2012060354 A1 * | 5/2012 | ............ F16C 33/805 |

* cited by examiner

*Primary Examiner* — Phillip A Johnson
(74) *Attorney, Agent, or Firm* — Oliff PLC

(57) ABSTRACT

A bearing apparatus for wheels includes an outer ring, a hub shaft, rolling elements, a seal attached to a vehicle-outer-side part of the outer ring, a rotating slinger attached to the vehicle-outer-side part of the hub shaft and contacted by the seal, and a fixed slinger attached to a vehicle-outer-side outer periphery of the outer ring and contacted by the seal. An outer peripheral surface of the outer ring has a non-plated surface portion provided at a vehicle-outer-side end of the outer ring and a plated surface portion that is continuous with the non-plated surface portion. The fixed slinger has an inner cylindrical portion externally fitted over and attached to the non-plated surface portion. The seal has an inner lip that contacts the rotating slinger and an outer lip that contacts the inner cylindrical portion.

6 Claims, 3 Drawing Sheets

_US 9,982,713 B2_

BEARING APPARATUS FOR WHEELS

INCORPORATION BY REFERENCE

The disclosure of Japanese Patent Application No. 2016-004251 filed on Jan. 13, 2016 including the specification, drawings and abstract, is incorporated herein by reference in its entirety.

BACKGROUND OF THE INVENTION

1. Field of the Invention

The invention relates to a bearing apparatus for wheels.

2. Description of the Related Art

In vehicles such as automobiles, a bearing apparatus for wheels (hub unit) is used to support wheels so as to make the wheels rotatable. The bearing apparatus for wheels includes an outer ring, a hub shaft, and rolling elements. The outer ring is fixed to a suspension on a vehicle body side. The wheels are attached to the hub shaft. The rolling elements are provided between the outer ring and the hub shaft. In such a bearing apparatus for wheels, in order to restrain foreign matter such as water from entering, from a vehicle outer side, a bearing interior where the rolling elements are provided, a seal is attached to the vehicle outer side of the outer ring. A slinger that is contacted by the seal is attached to the vehicle outer side of the hub shaft (Japanese Patent Application Publication No. 2012-56412 (JP 2012-56412 A)).

A seal on the vehicle outer side is as depicted in FIG. 3. A seal 99 is attached to a vehicle-outer-side end of an outer ring 90. The seal 99 has inner lips 98$a$, 98$b$, 98$c$ and an outer lip 98$d$. The inner lips 98$a$, 98$b$, 98$c$ contact a slinger 91 attached to a hub shaft 92. The outer lip 98$d$ contacts an outer peripheral surface 90$a$ of the outer ring 90. The outer lip 98$d$ contacts the outer peripheral surface 90$a$ of the outer ring 90 to prevent foreign matter such as water (muddy water) from entering a bearing interior through a gap between a core 97 of the seal 99 and the outer ring 90.

In the bearing apparatus for wheels depicted in FIG. 3, the axially-outer-side outer peripheral surface 90$a$ of the outer ring 90 is contacted by the outer lip 98$d$ and is thus machined. Thus, even when the outer ring 90 is coated or plated, a base material is exposed, by machining, from a portion of the outer ring 90 that can be contacted by the outer lip 98$d$. Thus, in a machined surface K0 from which the base material is exposed, an area K1 located on a vehicle inner side with respect to a contact portion X contacted by the outer lip 98$d$ is exposed to the exterior and may be rusted. When the externally exposed area K1 of the machined surface K0 is rusted and the rust progresses, sealing performance of the outer lip 98$d$ is deteriorated.

SUMMARY OF THE INVENTION

An object of the invention is to provide a bearing apparatus for wheels that has an enhanced rust prevention function.

A bearing apparatus for wheels in an aspect of the invention includes an outer ring fixed to a vehicle-body-side member, a hub shaft provided inward of the outer ring in a radial direction and having a flange portion for wheel attachment on a vehicle outer side, rolling elements provided between the outer ring and the hub shaft, a seal attached to a vehicle-outer-side part of the outer ring, a rotating slinger attached to a vehicle-outer-side part of the hub shaft and contacted by the seal, and a fixed slinger attached to a vehicle-outer-side outer periphery of the outer ring and contacted by the seal. An outer peripheral surface of the outer ring has a non-plated surface portion provided at a vehicle-outer-side end of the outer ring and a plated surface portion that is continuous with the non-plated surface portion. The fixed slinger has an inner cylindrical portion externally fitted over and attached to the non-plated surface portion. The seal has an inner lip that contacts the rotating slinger and an outer lip that contacts the inner cylindrical portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
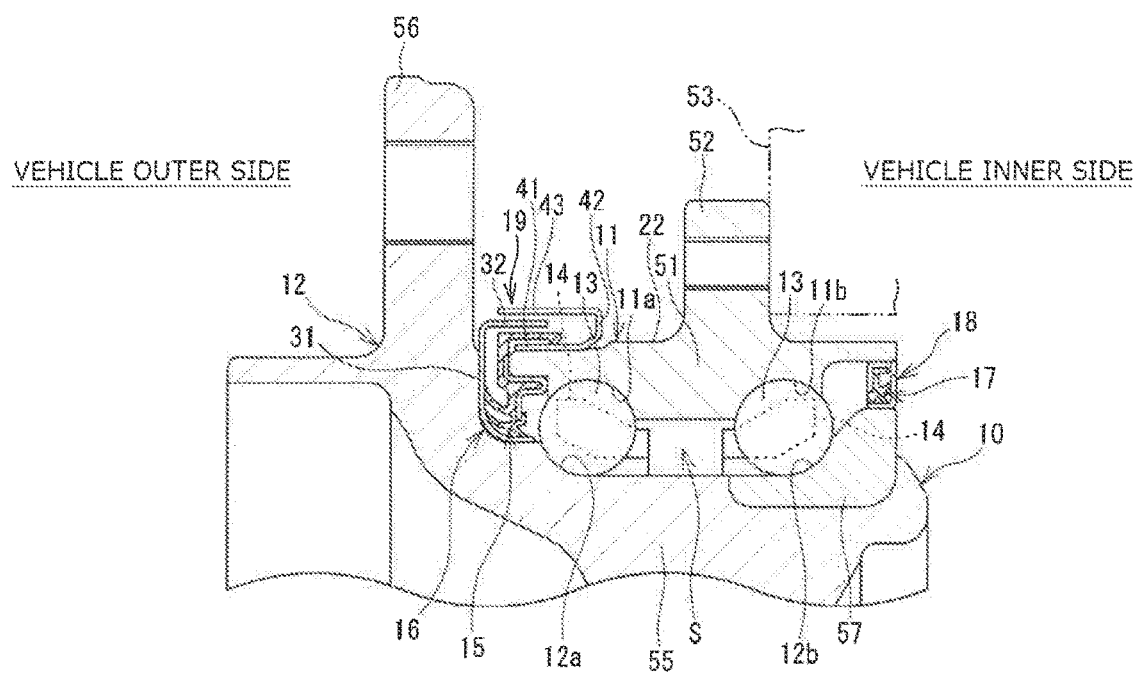
FIG. 1 is a sectional view depicting an embodiment of a bearing apparatus for wheels in the invention.

An embodiment of the invention will be described below based on the drawings. FIG. 1 is a sectional view depicting an embodiment of a bearing apparatus for wheels in the invention. A bearing apparatus for wheels (hub unit) 10 is, for example, attached to a suspension on a vehicle body side of an automobile to support wheels so as to make the wheels rotatable. The bearing apparatus for wheels 10 includes an outer ring 11, a hub shaft 12, rolling elements 13, a cage 14, seals 15, 17, rotating slingers 16, 18, and a fixed slinger 19.

The outer ring 11 is a cylindrical member formed of, for example, high-carbon steel. The outer ring 11 has a cylindrical outer ring main body 51 and a flange portion 52 for fixation. The flange portion 52 extends outward from the outer ring main body 51 in a radial direction. The flange portion 52 is fixed to a knuckle 53 that is a vehicle-body-side member. Consequently, the bearing apparatus for wheels 10 including the outer ring 11 is fixed to the knuckle 53. With the bearing apparatus for wheels 10 fixed to the vehicle body side, the side on which a flange portion 56 described below is provided for wheel attachment on the hub shaft 12 corresponds to a vehicle outer side. In other words, a left side in FIG. 1 (flange portion 56 side) corresponds to the vehicle outer side, and a right side in FIG. 1 corresponds to a vehicle inner side. A lateral direction in FIG. 1 corresponds to an axial direction of the bearing apparatus for wheels 10. On an inner peripheral surface of the outer ring 11, a vehicle-outer-side outer-ring raceway surface 11$a$ and a vehicle-inner-side outer-ring raceway surface 11$b$ are formed.

The hub shaft 12 has a shaft main body portion 55, the flange portion 56 for wheel attachment, and an inner ring member 57. The shaft main body portion 55, the flange portion 56, and the inner ring member 57 are formed of, for example, high-carbon steel. The shaft main body portion 55 is a shaft member that is elongate in the axial direction. The flange portion 56 extends outward in the radial direction from the vehicle-outer-side part of the shaft main body portion 55. The inner ring member 57 is an annular member that is fixedly fitted on the vehicle-inner-side part of the shaft main body portion 55. A wheel and a brake rotor not depicted in the drawings are attached to the flange portion 56. A shaft raceway surface 12a is formed on a vehicle-outer-side outer peripheral surface of the shaft main body portion 55. An inner-ring raceway surface 12b is formed on an outer peripheral surface of the inner ring member 57.

The vehicle-outer-side outer-ring raceway surface 11a and the shaft raceway surface 12a face each other in the radial direction. The vehicle-inner-side outer-ring raceway surface 11b and the inner-ring raceway surface 12b face each other in the radial direction. Balls that are rolling elements 13 are arranged between the vehicle-outer-side raceway surfaces and the vehicle-inner-side raceway surfaces. Two rows of the rolling elements (balls) 13 are provided. The rolling elements (balls) 13 in each row are held by an annular cage 14. The rolling elements 13 are provided between the outer ring 11 and the hub shaft 12. Consequently, the hub shaft 12 is concentrically arranged inward of the outer ring 11 in the radial direction. An annular space S is formed between the outer ring 11 and the hub shaft 12. An area in the annular space S where the two rows of the rolling elements 13 are arranged corresponds to a bearing interior.

Figure 2:
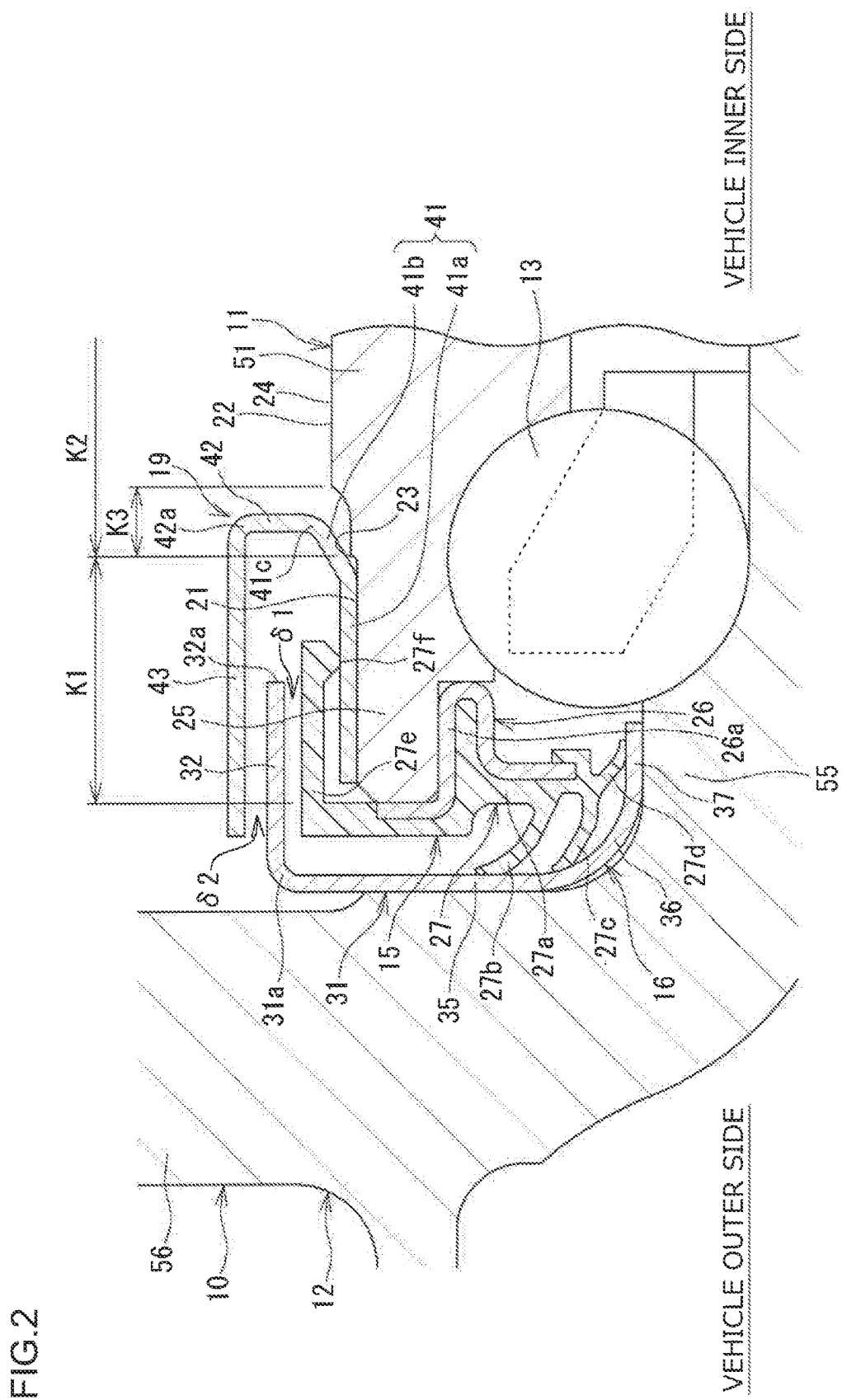
FIG. 2 is an enlarged sectional view of a vehicle-outer-side end of an outer ring, a sealing apparatus including a seal, a rotating slinger, and a fixed slinger, and components around the sealing apparatus.
Figure 3:
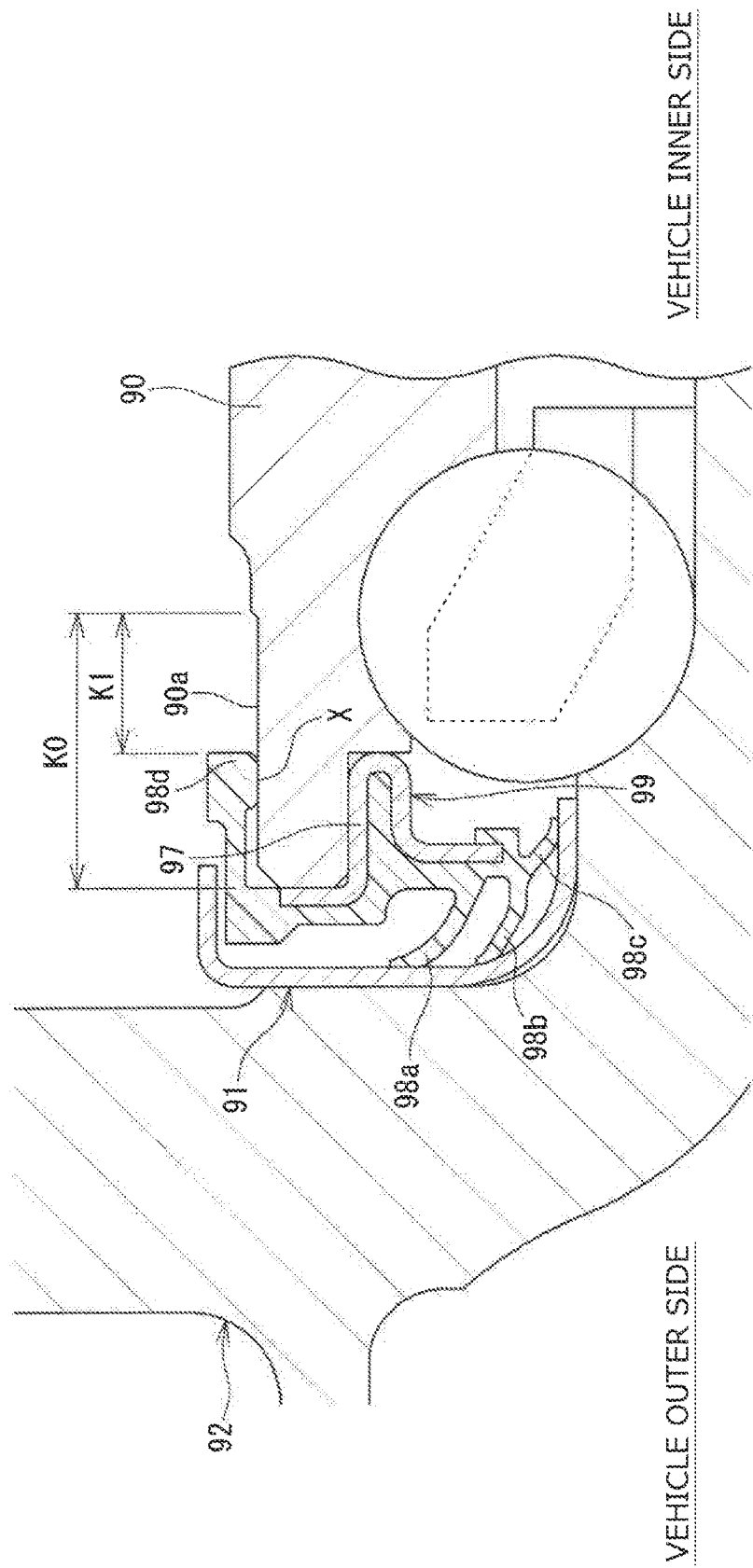
FIG. 3 is an enlarged sectional view depicting a part of a conventional bearing apparatus for wheels.

The outer ring 11 is entirely plated. However, an inner peripheral surface of the outer ring 11, including the outer-ring raceway surfaces 11a, 11b, is ground, and therefore, plating is removed from the inner peripheral surface, which is thus a machined surface (ground surface) with the base material of the outer ring 11 exposed. A part of an outer peripheral surface of the outer ring 11 is also ground, and therefore, plating is removed from this part, which is thus a machined surface (ground surface) with the base material of the outer ring 11 exposed therefrom. As depicted in FIG. 2, an area K1 at a vehicle-outer-side end 25 is the area of the outer peripheral surface of the outer ring 11 from which the plating is removed. The area K1 corresponds to a non-plated surface portion 21. As also described below, the fixed slinger 19 is attached to and externally fitted over the non-plated surface portion 21, and the area from which the plating has been removed is hidden by the fixed slinger 19.

The area K1 from which plating has been removed (non-plated surface portion 21) is a machined surface (ground surface) and forms a machining reference surface for grinding of the inner peripheral surface of the outer ring 11. In other words, the machining reference surface is provided on an outer peripheral surface of the end 25 of the outer ring 11. Although not depicted in the drawings, a shoe (patch) is brought into contact with the machining reference surface during the production of the outer ring 11 so as to receive a machining force (pressing force) exerted on the outer ring 11 by a grinding wheel.

The machining reference surface (non-plated surface portion 21) is ground and is thus an accurately formed cylindrical surface. In other words, the non-plated surface portion 21, which is a cylindrical surface, is smooth and has a high roundness and a constant outside diameter. A center line of the non-plated surface portion 21, which is a cylindrical surface, corresponds to a center line of the outer ring 11. The center line is the same as a center line of the bearing apparatus for wheels 10.

A plated layer is provided in an area K2, that is, the entire outer peripheral surface of the outer ring 11 except for the area K1. Thus, the area K1 corresponds to the non-plated surface portion 21, and the area K2 corresponds to a plated surface portion 22. The outer peripheral surface of the outer ring 11 has the non-plated surface portion 21 and the plated surface portion 22. The non-plated surface portion 21 is provided at the vehicle-outer-side end 25. The plated surface portion 22 is continuous with the non-plated surface portion 21.

The hub shaft 12 is also entirely plated. However, an outer peripheral surface of the hub shaft 12, including the shaft raceway surface 12a and the inner-ring raceway surface 12b, is also ground. Consequently, plating has been removed from a certain area of the hub shaft 12.

As depicted in FIG. 1, a sealing apparatus including the seal 15, the rotating slinger 16, and the fixed slinger 19 is provided on the vehicle outer side. A sealing apparatus including the seal 17 and the slinger 18 is provided on the vehicle inner side. In each of the sealing apparatuses, the seal 15 (17) contacts the slinger 16 (18). This enables prevention of foreign matter from a bearing exterior such as water (muddy water) from entering a bearing interior and prevention of a lubricant (grease) provided in the bearing interior from leaking to the bearing exterior. In the vehicle-outer-side sealing apparatus, the seal 15 contacts the fixed slinger 19. This restrains foreign matter such as external water (muddy water) from entering the bearing interior through a gap between the outer ring 11 and a core 26 (see FIG. 2) of the seal 15. The seal 15, the rotating slinger 16, and the fixed slinger 19 form labyrinth clearances (δ1, δ2) to restrain foreign matter such as external water (muddy water) from entering through a contact portion between the seal 15 and the rotating slinger 16.

The seal 15, the rotating slinger 16, and the fixed slinger 19, which are located on the vehicle outer side, will further be described. In FIG. 2, the seal 15 is attached to an inner periphery of the vehicle-outer-side end 25 of the outer ring 11. The rotating slinger 16 is attached to the vehicle-outer-side part of the hub shaft 12 and rotates integrally with the hub shaft 12. A part of the seal 15 (inner lips 27b, 27c, 27d) contacts the rotating slinger 16. The fixed slinger 19 is attached to an outer periphery of the vehicle-outer-side end 25 of the outer ring 11, and forms a non-rotating member along with the outer ring 11 and the seal 15. The remaining part of the seal 15 (outer lip 27e) contacts the fixed slinger 19.

The seal 15 has metal core 26 and a rubber seal main body 27. The seal main body 27 has a fixed portion 27a, the inner lips 27b, 27c, 27d, and the outer lip 27e. The fixed portion 27a is fixed (vulcanized and bonded) to the core 26. The inner lips 27b, 27c, 27d are provided inward of the end 25 of the outer ring 11 in the radial direction. The outer lip 27e is provided outward of the end 25 in the radial direction. The inner lips 27b, 27c, 27d protrude from a radially-inner-side part of the fixed portion 27a. The outer lip 27e protrudes from a radially-outer-side part of the fixed portion 27a. The core 26 has a cylindrical portion 26a as an outer peripheral portion thereof. The cylindrical portion 26a is fitted to and in contact with an inner peripheral surface of the end 25 of the outer ring 11 to fix the seal 15 to the outer ring 11.

The rotating slinger 16 is attached to the vehicle-outer-side part of the hub shaft 12. The inner lips 27b, 27c, 27d of the seal 15 contact the rotating slinger 16. Specifically, the rotating slinger 16 is attached to an outer periphery of a boundary portion between the shaft main body portion 55 and the flange portion 56 of the hub shaft 12. The rotating slinger 16 has an annular inner main body portion 31 and a cylindrical outer portion 32. The inner main body portion 31 has an inner circular ring portion 35, a curved surface portion 36, and a short cylinder portion 37 arranged in this order from the outer portion 32 side. The short cylinder portion 37 is externally fitted over the shaft main body portion 55, and the inner circular ring portion 35 is in contact with a side surface of the flange portion 56. The inner main body portion 31 is attached to the vehicle-outer-side part of the hub shaft 12 to allow the rotating slinger 16 to rotate integrally with the hub shaft 12.

The inner lips 27b, 27c, 27d contact the inner main body portion 31 of the rotating slinger 16. The cylindrical outer portion 32 extends in the axial direction from a radially outer end 31a of the inner main body portion 31 toward the vehicle inner side. The cylindrical outer portion 32 faces the outer lip 27e via the radial clearance 81. A vehicle-inner-side tip portion 32a of the cylindrical outer portion 32 is positioned outward of a lip tip 27f of the outer lip 27e in the radial direction. The lip tip 27f contacts an inner cylindrical portion 41 of the fixed slinger 19.

The fixed slinger 19 is attached to an outer periphery of the vehicle-outer-side end 25 of the outer ring 11. The fixed slinger 19 has an inner cylindrical portion 41 shaped like a cylinder. The inner cylindrical portion 41 is attached to the outer ring 11 by being externally fitted over the non-plated surface portion 21. In the present embodiment, the inner cylindrical portion 41 has a main-body tube portion 41a and an annular portion 41b. The main-body tube portion 41a is fitted over and in close contact with the non-plated surface portion 21. The annular portion 41b externally covers a part of the plated surface portion 22 in the radial direction. The annular portion 41b is continuous with the main-body tube portion 41a and is tapered so as to have a diameter increasing toward the vehicle inner side. The annular portion 41b is positioned radially outward of a boundary 23 between the non-plated surface portion 21 and the plated surface portion 22. The inner cylindrical portion 41 externally covers the entire non-plated surface portion 21 in the radial direction.

In the present embodiment, the fixed slinger 19 has a circular ring portion (outer circular ring portion) 42 and an outer cylindrical portion 43. The circular ring portion (outer circular ring portion) 42 extends outward in the radial direction from a vehicle-inner-side end 41c of the inner cylindrical portion 41 (annular portion 41b). The outer cylindrical portion 43 extends from a radially outer end 42a of the circular ring portion 42 toward the vehicle outer side. The circular ring portion 42 is shaped like a circular ring. The radially outer end 42a is positioned outward of the cylindrical outer portion 32 in the radial direction. The outer cylindrical portion 43 is shaped like a cylinder and faces the cylindrical outer portion 32 via the radial clearance 82.

The inner lips 27b, 27c, 27d of the seal 15 contacts the inner main body portion 31, which is a part of the rotating slinger 16, and the outer lip 27e is in contact with the main-body tube portion 41a of the inner cylindrical portion 41, which is a part of the fixed slinger 19.

As described above, the outer peripheral surface of the outer ring 11 is plated so that a plated layer is formed. However, the end 25 is turned and the resultant turned surface is ground. The grinding allows the base material of the outer ring 11 to be exposed to form the non-plated surface portion 21. In FIG. 2, the area of the turned surface is denoted by K3. The end 25 of the outer ring 11 has a stepped shape in which the outside diameter of the end 25 decreases in a stepwise fashion toward the vehicle outer side. An outer peripheral surface of the outer ring main body 51 has a linear cylindrical surface 24 located on the vehicle inner side with respect to the area K3 of the turned surface and centered around the center line of the outer ring 11. The cylindrical surface 24 is included in the plated surface portion 22. In the present embodiment, plating remains in the area K3 of the turned surface, which is thus included in the plated surface portion 22.

In the bearing apparatus for wheels 10 configured as described above, for the outer ring 11, the plated surface portion 22 enables a rust prevention function to be enhanced. The non-plated surface portion 21 can also be restrained from being rusted because the fixed slinger 19 (inner cylindrical portion 41) is externally fitted over and attached to the non-plated surface portion 21.

In particular, in the present embodiment, the inner cylindrical portion 41 of the fixed slinger 19 has the main-body tube portion 41a and the annular portion 41b. The main-body tube portion 41a is fitted over and in close contact with the non-plated surface portion 21. The annular portion 41b externally covers a part of the plated surface portion 22 (a part of the area K3) in the radial direction. The vehicle-inner-side end 41c of the annular portion 41b is positioned on the vehicle inner side with respect to the boundary 23. More specifically, the end 41c of the annular portion 41b is located beyond the boundary 23 toward the vehicle inner side and positioned outward of the area K3 of the turned surface in the radial direction. Thus, the non-plated surface portion 21 is entirely externally covered by the inner cylindrical portion 41 in the radial direction and is not visible externally in the radial direction.

The outer lip 27e of the seal 15 is in contact with the inner cylindrical portion 41 of the fixed slinger 19. This enables foreign matter such as external water to be prevented from entering the bearing interior along the end 25 of the outer ring 11. In other words, the outer lip 27e functions as a deflector seal.

In the present embodiment, the fixed slinger 19 has the annular circular ring portion 42 extending outward in the radial direction from the vehicle-inner-side end 41c of the inner cylindrical portion 41, contacted by the outer lip 27e. The circular ring portion 42 forms a wall extending in the radial direction and functions as a dam configured to inhibit entrance, into the bearing interior side (a contact surface between the outer lip 27e and the inner cylindrical surface 41), of foreign matter such as water which is present on the outer peripheral side of the outer ring 11 and particularly of the cylindrical surface 24. The circular ring portion 42 enables enhancement of a function to restrain foreign matter from entering the bearing interior.

In the fixed slinger 19, the outer cylindrical portion 43 extends from the radially outer end 42a of the circular ring portion 42 toward the vehicle outer side. The outer cylindrical portion 43 is positioned outward of the cylindrical outer portion 32 of the rotating slinger 16 in the radial direction, and faces the outer portion 32 via the radial clearance 82. As described above, the radial clearance 81 is formed between the outer portion 32 and the outer lip 27e. The radial clearance 82 and the radial clearance 81 form a labyrinth clearance. The labyrinth clearance is formed to meander as depicted in section in FIG. 2 to enable foreign matter such as water to be more effectively restrained from entering the bearing interior.

In the present embodiment, the non-plated surface portion 21 is a machined surface serving as a reference for machining of the outer ring 11. Thus, the non-plated surface portion 21 is accurately formed. The fixed slinger 19 attached to the non-plated surface portion 21 is produced by metal stamping and accurately formed. Both the non-plated surface portion 21 and the fixed slinger 19 are accurately formed. Consequently, when the fixed slinger 19 is fitted over the non-plated surface portion 21, the fixed slinger 19 and the non-plated surface portion 21 come into close contact with each other to make a clearance unlikely to be formed. This makes foreign matter such as water unlikely to enter between the non-plated surface portion 21 and the fixed slinger 19. Furthermore, instead of forming the non-plated surface portion 21 by additional machining, the present embodiment utilizes, as a surface for attachment of the fixed slinger 19, the machined surface serving as a reference for grinding of the outer ring 11. This enables a possible increase in machining cost (machining man-hour) to be prevented.

As described above, the bearing apparatus for wheels 10 in the present embodiment allows the rust prevention function to be enhanced compared to the related art, and enables water (muddy water) and the like to be restrained from entering the bearing interior on the vehicle outer side wherever possible. As a result, the life of the bearing can be prevented from being shortened by entrance of water (muddy water) and the like into the bearing interior.

The embodiment disclosed above is illustrative in every way and is not restrictive. In other words, the bearing apparatus for wheels in the invention is not limited to the illustrated forms and may be in any other form within the scope of the invention. In the form depicted in FIG. 1, the rolling elements 13 are described as balls. However, the rolling elements 13 may be tapered rollers or the like.

In the bearing apparatus for wheels in the invention, for the outer ring, the plated surface portion enables the rust prevention function to be enhanced. The inner cylindrical portion of the fixed slinger is externally fitted over and attached to the non-plated surface portion to enable the non-plated surface portion to be restrained from being rusted. Consequently, a bearing apparatus for wheels is obtained which provides a higher rust prevention function than conventional bearing apparatuses for wheels.

What is claimed is:

1. A bearing apparatus for wheels comprising:
   an outer ring fixed to a vehicle-body-side member;
   a hub shaft provided inward of the outer ring in a radial direction and having a flange portion for wheel attachment on a vehicle outer side;
   rolling elements provided between the outer ring and the hub shaft;
   a seal attached to a vehicle-outer-side part of the outer ring;
   a rotating slinger attached to a vehicle-outer-side part of the hub shaft and contacted by the seal; and
   a fixed slinger attached to a vehicle-outer-side outer periphery of the outer ring and contacted by the seal, wherein
   an outer peripheral surface of the outer ring has a non-plated surface portion provided at a vehicle-outer-side end of the outer ring and a plated surface portion that is continuous with the non-plated surface portion,
   the fixed slinger has an inner cylindrical portion externally fitted over and attached to the non-plated surface portion, and
   the seal has an inner lip that contacts the rotating slinger and an outer lip that contacts the inner cylindrical portion.

2. The bearing apparatus for wheels according to claim 1, wherein the inner cylindrical portion has a main-body tube portion fitted over and in contact with the non-plated surface portion and an annular portion that is continuous with the main-body tube portion and that externally covers a part of the plated surface portion in the radial direction.

3. The bearing apparatus for wheels according to claim 2, wherein the fixed slinger has a circular ring portion extending outward in the radial direction from a vehicle-inner-side end of the inner cylindrical portion.

4. The bearing apparatus for wheels according to claim 3, wherein the rotating slinger has an inner main body portion attached to the vehicle-outer-side part of the hub shaft and contacted by the inner lip and a cylindrical outer portion that extends from a radially outer end of the inner main body portion toward a vehicle inner side and that faces the outer lip via a radial clearance, and the fixed slinger has an outer cylindrical portion that extends from a radially outer end of the circular ring portion toward the vehicle outer side and that faces the outer portion via a radial clearance.

5. The bearing apparatus for wheels according to claim 1, wherein the fixed slinger has a circular ring portion extending outward in the radial direction from a vehicle-inner-side end of the inner cylindrical portion.

6. The bearing apparatus for wheels according to claim 5, wherein the rotating slinger has an inner main body portion attached to the vehicle-outer-side part of the hub shaft and contacted by the inner lip and a cylindrical outer portion that extends from a radially outer end of the inner main body portion toward a vehicle inner side and that faces the outer lip via a radial clearance, and the fixed slinger has an outer cylindrical portion that extends from a radially outer end of the circular ring portion toward the vehicle outer side and that faces the outer portion via a radial clearance.

* * * * *